(12) United States Patent
Chen

(10) Patent No.: US 11,825,513 B2
(45) Date of Patent: Nov. 21, 2023

(54) RANDOM ACCESS RESOURCE PROCESSING METHOD AND DEVICE

(71) Applicant: VIVO MOBILE COMMUNICATION CO., LTD., Chang'an Dongguan (CN)

(72) Inventor: Li Chen, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 94 days.

(21) Appl. No.: 16/637,983

(22) PCT Filed: Aug. 7, 2018

(86) PCT No.: PCT/CN2018/099181
§ 371 (c)(1),
(2) Date: Feb. 10, 2020

(87) PCT Pub. No.: WO2019/029527
PCT Pub. Date: Feb. 14, 2019

(65) Prior Publication Data
US 2020/0214035 A1 Jul. 2, 2020

(30) Foreign Application Priority Data
Aug. 11, 2017 (CN) .......................... 201710687886.5

(51) Int. Cl.
*H04W 74/00* (2009.01)
*H04W 74/08* (2009.01)
*H04W 72/21* (2023.01)

(52) U.S. Cl.
CPC ......... *H04W 74/008* (2013.01); *H04W 72/21* (2023.01); *H04W 74/0833* (2013.01)

(58) Field of Classification Search
CPC .......... H04W 74/008; H04W 72/0413; H04W 74/0833
See application file for complete search history.

(56) References Cited

U.S. PATENT DOCUMENTS

| 2010/0296467 | A1 | 11/2010 | Pelletier et al. |
| 2018/0167971 | A1 | 6/2018 | Liu et al. |
| 2018/0368126 | A1* | 12/2018 | Islam ................... H04L 5/1469 |
| 2019/0052337 | A1* | 2/2019 | Kwon ................ H04W 72/085 |
| 2019/0268893 | A1* | 8/2019 | Tsai ...................... H04W 16/28 |

(Continued)

FOREIGN PATENT DOCUMENTS

| CN | 1897723 A | 1/2007 |
| CN | 102440057 A | 5/2012 |

(Continued)

OTHER PUBLICATIONS

Omri, et al. "Synchronization Procedure in 5G NR Systems" IEEE Access Mar. 2019. (Year: 2019).*

(Continued)

*Primary Examiner* — Basil Ma
(74) *Attorney, Agent, or Firm* — von Briesen & Roper, s.c.

(57) ABSTRACT

The present disclosure provides a random access resource processing method and device. The method includes: receiving first indication information from a network device, where the first indication information is used to indicate whether a preset random access resource is available; and transmitting first acknowledgment information to the network device.

19 Claims, 6 Drawing Sheets

(56) References Cited

U.S. PATENT DOCUMENTS

| | | | |
|---|---|---|---|
| 2020/0067589 A1* | 2/2020 | Jeong | H04W 24/10 |
| 2020/0275514 A1* | 8/2020 | Takahashi | H04W 72/042 |

FOREIGN PATENT DOCUMENTS

| | | |
|---|---|---|
| WO | WO 2017/024468 A1 | 2/2017 |
| WO | WO 2017/024516 A1 | 2/2017 |

OTHER PUBLICATIONS

R1-1707245 Vivo "Beam Recovery based on NR-PDCCH and NR-PDSCH" 3GPP WG1 #89 Hangzhou May 15-19, 2017 (Year: 2017).*

R1-1707832 MediaTek "Discussion on Beam Recovery Mechanism" 3GPP WG1 #89 Hangzhou May 15-19, 2017 (Year: 2017).*

R1-1709309 ZTE et al. "WF on beam recovery" 3GPP WG1 #89 Hangzhou May 15-19, 2017 (Year: 2017).*

Chinese First Office Action Application No. 201710687886.5; dated Aug. 19, 2019.

International Search Report & Written Opinion related to Application No. PCT/CN2018/099181; dated Oct. 23, 2018.

VIVO; "Discussion on beam recovery", 3GPP TSG RAN WG1 Meeting #88, R1-1703389, Athens, Greece, Feb. 13, 2017-Feb. 17, 2017.

VIVO; "Beam recovery based on NR-PDCCH and NR-PDSCH", 3GPP TSG RAN WG1 Meeting #89, R1-1707245, Hangzhou, P.R. China, May 15, 2017-May 19, 2017.

Mediatek Inc.; "Discussion on PRACH design to support uplink requests", 3GPP TSG RAN WG1 Meeting #89, R1-1707840, Hangzhou, P.R. China, May 15, 2017-May 19, 2017.

VIVO; "Discussion on beam recovery", 3GPP TSG RAN WG1 Meeting #88, R1-1704489, Spokane, Washington, USA, Apr. 3, 2017-Apr. 7, 2017.

VIVO; "Random Access in NR", 3GPP TSG RAN WG2 Meeting #98, R1-1704579, Hangzhou, P.R. China May 15, 2017-May 19, 2017.

* cited by examiner

RANDOM ACCESS RESOURCE PROCESSING METHOD AND DEVICE

CROSS-REFERENCE TO RELATED APPLICATION

This patent application is a 35 USC § 371 U.S. national stage of International Application No. PCT/CN2018/099181 filed on Aug. 7, 2018, which claims the benefit and priority of Chinese Patent Application No. 201710687886.5, filed on Aug. 11, 2017, which is incorporated herein by reference in its entirety.

TECHNICAL FIELD

The present disclosure relates to the field of computer technologies, and in particular to a random access resource processing method and device.

BACKGROUND

In the future fifth-generation mobile communication system (5$^{th}$ Generation, 5G), in order to achieve the goal of a downlink transmission rate of 20 Gbps and an uplink transmission rate of 10 Gbps, high-frequency communication and large-scale antenna technology will be introduced. High-frequency communication can provide a wider system bandwidth, and the antenna size can be smaller, which facilitates deployment of large-scale antenna in the Node B (NB) and user equipment (UE). The high-frequency communication has the disadvantages of large path loss, susceptibility to interference and fragile links, while the large-scale antenna technology can provide large antenna gain. Thus, combination of the high-frequency communication and large-scale antennas is an inevitable trend of the future 5G mobile communication systems. However, the large-scale antenna technology cannot solve all high-frequency communication problems, such as link fragility. When occlusion is encountered in the high-frequency communication, the beam failure recovery mechanism can quickly switch beams, i.e., switching communication link from a poor beam to a better beam, thereby avoiding radio link failure and effectively improving link robustness.

Referring to FIG. 1, the beam failure recovery mechanism includes the following steps:
at step 12, detecting beam failure;
at step 14, identifying a new candidate beam;
at step 16, transmitting a beam failure recovery request;
at step 18, UE monitoring a gNB response for the beam failure recovery request.

In addition, the 5G system supports transmitting the beam failure recovery request based on contention-free physical random access channel (PRACH). PRACH resources used for transmitting the beam failure recovery request are orthogonal to ordinary PRACH resources, in at least orthogonal frequency division multiplex mode. The 5G system supports transmitting the beam failure recovery request based on Physical Uplink Control Channel (PUCCH).

In the LTE system, contention-free RACH resources, dedicated contention-based random access PRACH resources and preamble codes are configured in advance by an evolutional Node B, eNB or e-Node B, and may be transmitted to UE through PDCCH order or Radio Resource Control (RRC) message.

The dedicated PRACH resource configured in each time can only be used for one RACH access procedure (including multiple retransmissions of msg.1). In next access procedure, the eNB will configure PRACH resources for the UE again.

Currently, in the procedure of activating/deactivating RACH resources for the beam failure recovery, the network device may fail to transmit an activation command or a deactivation command of the RACH resource to the UE due to downlink beam failure, resulting in that the network device and UE have different understandings of configuration of RACH resources. Further, when the activation command is not successfully transmitted to the UE, it will result in waste of RACH resources. When the deactivation command is not successfully transmitted to the UE, it will cause conflicts in the random access procedure of the UE for beam failure recovery.

SUMMARY

In a first aspect, an embodiment of the present disclosure provides a random access resource processing method, including:
receiving first indication information from a network device, wherein the first indication information is used to indicate whether a preset random access resource is available; and
transmitting first acknowledgment information to the network device.

In a second aspect, an embodiment of the present disclosure provides a random access resource processing method, including:
transmitting first indication information to a user equipment (UE), wherein the first indication information is used to indicate whether a preset random access resource is available;
receiving first acknowledgment information from the UE.

In a third aspect, an embodiment of the present disclosure provides a random access resource processing device, including:
a first receiving unit configured to receive first indication information from a network device, wherein the first indication information is used to indicate whether a preset random access resource is available; and
a first transmission unit configured to transmit first acknowledgment information to the network device.

In a fourth aspect, an embodiment of the present disclosure provides a random access resource processing device, including:
a first transmission unit configured to transmit first indication information to a user equipment (UE); wherein the first indication information is used to indicate whether a preset random access resource is available;
a first receiving unit configured to receive first acknowledgment information from the UE.

In a fifth aspect, an embodiment of the present disclosure provides a user equipment, including: a memory, a processor, and a random access resource processing program stored on the memory and executable on the processor; wherein the random access resource processing program is executed by the processor to implement steps of the above random access resource processing method.

In a sixth aspect, an embodiment of the present disclosure provides a computer-readable storage medium including a random access resource processing program stored thereon; wherein the random access resource processing program is executed by a processor to implement steps of the above random access resource processing method.

In a seventh aspect, an embodiment of the present disclosure provides a network device including a memory, a processor, and a random access resource processing program stored on the memory and executable on the processor; wherein the random access resource processing program is executed by the processor to implement steps of the above random access resource processing method.

In an eighth aspect, an embodiment of the present disclosure provides a computer-readable storage medium including a random access resource processing program stored thereon; wherein the random access resource processing program is executed by a processor to implement steps of the above random access resource processing method.

BRIEF DESCRIPTION OF THE DRAWINGS

The drawings described herein are used to provide a further understanding of the present disclosure and constitute a part of the present disclosure. Exemplary embodiments of the present disclosure and the description thereof are used to explain the present disclosure, and do not constitute an improper limitation on the present disclosure. In the drawing.

DETAILED DESCRIPTION

In order to make the objects, the technical solutions and the advantages of the present disclosure more apparent, the technical solutions of the present disclosure will be described hereinafter in a clear and complete manner in conjunction with the drawings and embodiments. Obviously, the following embodiments are merely a part of, rather than all of, the embodiments of the present disclosure, and based on these embodiments, a person skilled in the art may obtain the other embodiments, which also fall within the scope of the present disclosure.

The technical solutions of the present disclosure may be applied to various communication systems, such as Global System of Mobile communication (GSM), Code Division Multiple Access (CDMA) system, Wideband Code Division Multiple Access (WCDMA), General Packet Radio Service (GPRS), Long Term Evolution (LTE)/Long Term Evolution Advanced (LTE-A), and New Radio (NR).

User Equipment (UE), which may also be referred as a mobile terminal, a mobile user equipment, or the like, may communicate with one or more core networks via a radio access network (RAN). The user equipment may be a mobile terminal, such as a mobile phone (or referred as "cellular" phone) and a computer with a mobile terminal such as a portable, pocket-sized, handheld, computer built-in or in-vehicle mobile device, which exchanges languages and/or data with the radio access network.

Base station may be a Base Transceiver Station (BTS) in GSM or CDMA, or may be a Node B in WCDMA, or may be an eNB in the LTE and a 5G base station (gNB), which is not limited in the present disclosure. However, for convenience of description, the following embodiments are described by taking gNB as an example.

Figure 1:
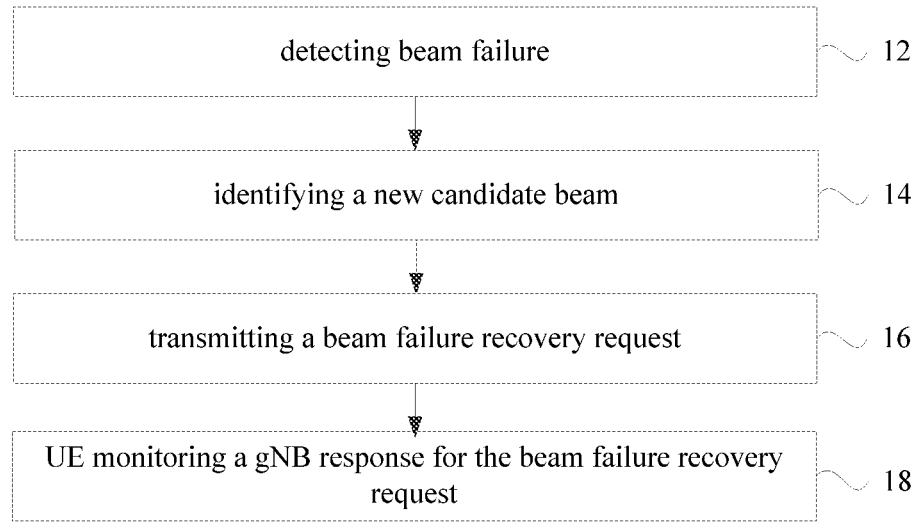
FIG. 1 is a schematic flowchart of a beam failure recovery mechanism.
Figure 2:
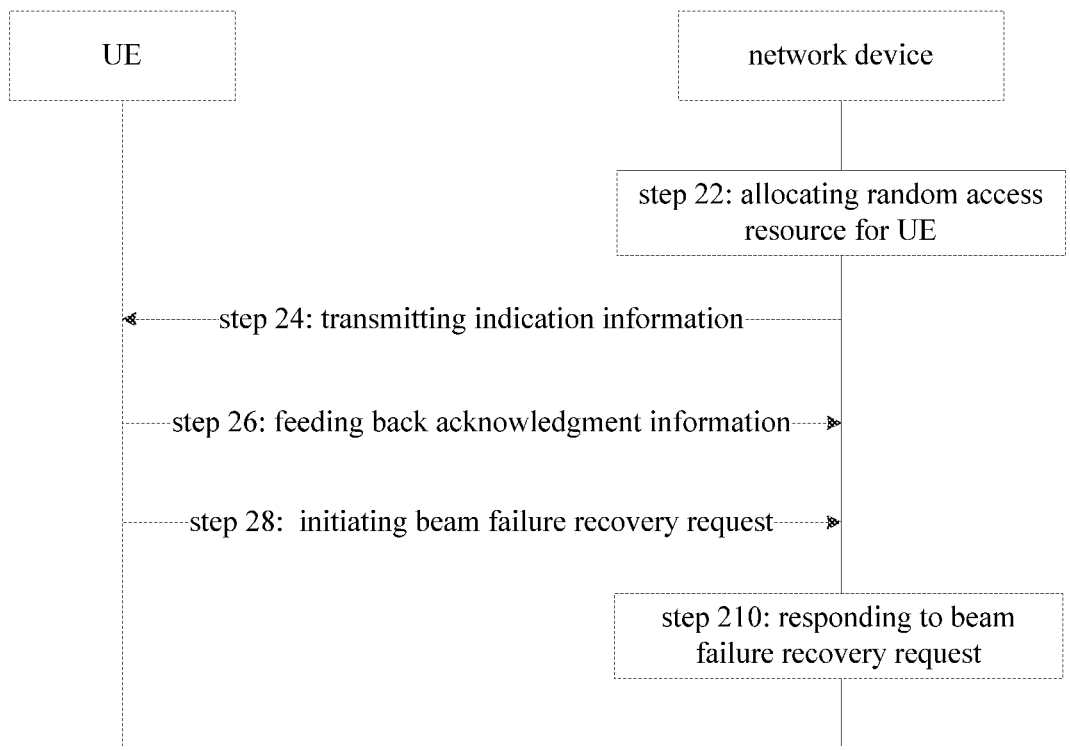
FIG. 2 is diagram of an application scenario according to an embodiment of the present disclosure.

Referring to FIG. 2, an application scenario of one embodiment of the present disclosure is exemplarily described hereinafter:

at step 22, the network device allocates a random access resource RACH for the user equipment (UE), and notifies the UE;

at step 24, the network device transmits indication information to the UE to notify the UE whether the allocated random access resource is available;

at step 26, the UE feeds back acknowledgment information to notify the network device that the indication information has been received.

at step 28, when a beam failure occurs in the UE, the UE initiates a beam failure recovery request to the network device based on the random access resource;

at step 210, response to the request initiated by the UE the network device, the network device performs the beam failure recovery mechanism shown in FIG. 1.

It is not difficult to understand that the random access resource may also be a predefined random access resource.

The technical solutions provided in various embodiments of the present disclosure are described hereinafter in details with reference to the accompanying drawings.

First Example

Figure 3:
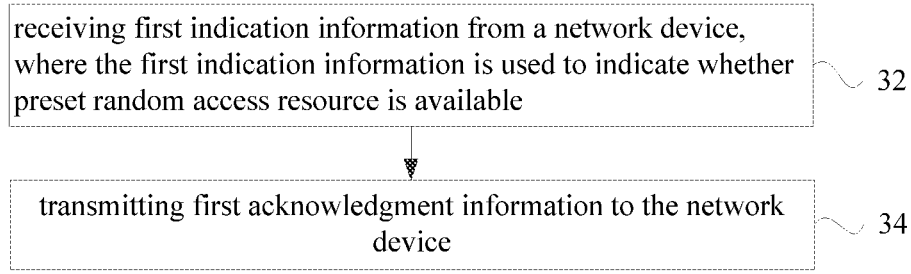
FIG. 3 is a schematic flowchart of a random access resource processing method according to a first embodiment of the present disclosure.

FIG. 3 is a schematic flowchart of a random access resource processing method according to a first embodiment of the present disclosure. Referring to FIG. 3, the method specifically includes the following steps.

Step 32: receiving first indication information from a network device, where the first indication information is used to indicate whether preset random access resource is available.

The preset random access resource may be, for example, random access resource allocated by the network device for UE. The allocated random access resource includes at least one of time-domain random access resource, frequency-domain random access resource, allocation of preamble codes, bandwidth part BWPs constituting the system bandwidth, beam resources, and Synchronization Signal Block (SS Block) associated with beam resources/Channel State Information Reference Signal (CSI-RS).

It is not difficult to understand that the network device may allocate the random access resource for the UE based on ID of candidate beams. For example, based on ID of the candidate beam, time-domain random access resource and frequency-domain random access resource associated with the ID are allocated; and then, based on the default rule, the random access resource may be formed by combining the default bandwidth part BWP constituting the system bandwidth and spatial domain random access resource with the time-domain random access resource and frequency-domain random access resource associated with the ID.

Step 34: transmitting first acknowledgment information to the network device; where the first acknowledgment information is used to indicate that the first indication information has been received.

It should be noted that examples of transmitting first acknowledgment information include:

feeding back, by the UE, Uplink Control Information (UCI) carrying the first acknowledgment information to the network device through physical uplink control channel (PUCCH); or, feeding back radio resource control (RRC) message carrying the first acknowledgment information to the network device through RRC; or, feeding back, through Medium Access Control (MAC) Control Element (CE), the first acknowledgment information carried in the MAC CE to the network device.

Accordingly, the network device may also receive the first acknowledgment information by a receiving manner corresponding to the above feedback manner.

With reference to FIG. 2, it should be noted that, after receiving the first indication information transmitted by the network device, the UE transmits the first acknowledgment information to the network device according to the feedback mechanism, to notify the network device that the first indication information has been received. This allows the UE and the network device to have a consistent "understanding" of whether the allocated random access resources are available, thereby avoiding problems of waste of resources caused by the two sides' different "understanding" of whether the allocated random access resources are available, and inability to perform beam failure recovery normally.

For example, for random access resource A, the indication information issued by the network device is not received by the UE due to failure of the downlink beam, the two sides have different "understandings" of the random access resource A. The UE's "understands" is that the random access resource A is unavailable while the network device's "understands" is that the random access resource A is available to the UE. Based on such situation, when a beam failure occurs in the UE, since the UE considers that the random access resource A is unavailable, the beam failure recovery request cannot be initiated to the network device based on the random access resource A. Meanwhile, since the network device considers that the random access resource A is available to the UE, the network device will no longer indicate the UE that the random access resource A is available, and will not allocate the random access resource A to other UEs, thereby resulting in waste of the random access resource A.

Further, the step 32 may specifically include:

receiving activation indication information from the network device, where the activation indication information is used to indicate that the allocated random access resource is available; or, receiving deactivation indication information from the network device, where the deactivation indication information is used to indicate that the allocated or activated random access resource is unavailable.

After receiving the activation indication information, when triggering beam failure recovery, the UE may transmit the beam failure recovery request based on the allocated random access resources.

It is not difficult to understand that the allocated random access resources may be continuously in a cyclic process of activation-deactivation-activation-deactivation based on the first indication information transmitted by the network device.

It can be seen that in one embodiment of the present disclosure, by adding a feedback mechanism to the downlink indication information, the UE feeds back the first acknowledgment information to the network device when the UE receives the first indication information transmitted by the network device, so that the network device and the UE can know whether the allocated random access resources are available. Then, the random access resources can be reasonably used and the beam failure recovery can be performed normally.

Second Embodiment

Figure 4:
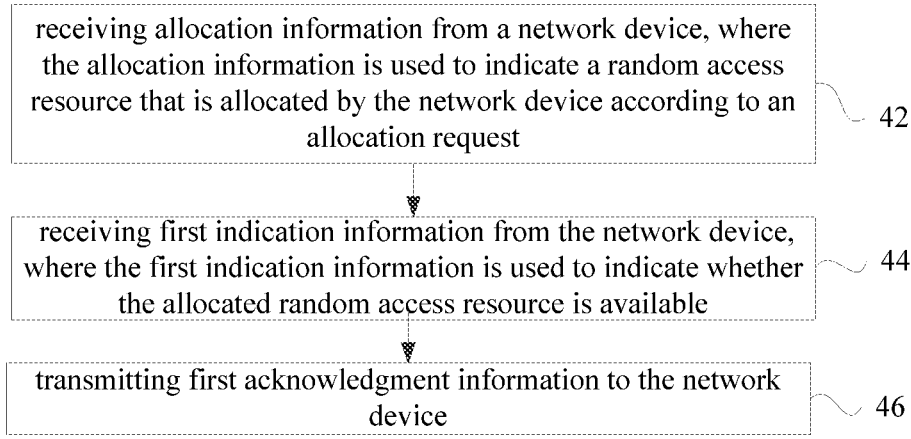
FIG. 4 is a schematic flowchart of a random access resource processing method according to a second embodiment of the present disclosure.

FIG. 4 is a schematic flowchart of a random access resource processing method according to a second embodiment of the present disclosure. Referring to FIG. 4, the method specifically includes the following steps.

Step 42: receiving allocation information from a network device, where the allocation information is used to indicate a random access resource that is allocated by the network device according to an allocation request;

Step 44: receiving first indication information from the network device, where the first indication information is used to indicate whether the allocated random access resource is available;

Step 46: transmitting first acknowledgment information to the network device; where the first acknowledgment information is used to indicate that the first indication information has been received.

It should be noted that the step 44 and the step 46 in this embodiment correspond to the step 32 and the step 34 in the first embodiment, respectively, and thus details will not elaborated herein and may be refer to the relevant description in the above embodiment.

In this embodiment, the manner in which the UE obtains the random access resource may be classified into the following two solutions.

First solution: the UE actively transmits an allocation request to the network device for requesting the network device to allocate random access resources. The network device allocates the random access resource for the UE according to the allocation request, and notifies the UE of the allocated random access resource in the form of the allocation information.

Second solution: the network device actively allocates the random access resource for the UE and notifies the UE of the allocated random access resource in the form of the allocation information.

It is not difficult to understand that, in the above two solutions, after receiving the allocation information, the UE may selectively return the acknowledgment information to the network device to notify the network device that the allocation information has been received.

In addition, after the network device allocates the random access resource for the UE, the network device further notifies the UE whether the allocated random access resource is available. For example, the indication information of whether the allocated random access resource is available is carried in the allocation information. Alternatively, the UE itself checks whether the allocated random access resource is available, for example, tentatively initiating a beam failure recovery request. Based on state of the allocated random access resource, this embodiment of the present disclosure may include the following two solutions.

First solution: when the UE learns that the allocated random access resource is in an available state, the UE initiates a beam failure recovery request to the network device based on the random access resource when a beam failure recovery is triggered.

Second solution, when the UE learns that the allocated random access resource is in an unavailable state, the allocated random access resource is available to the UE only after receiving activation indication information transmitted by the network device; then, the UE feeds back acknowledgment information; when a recovery is triggered, the UE initiates a beam failure recovery request to the network device based on the random access resource.

Examples of the beam failure trigger condition are as follow:
1. when the number of beam failures reaches a first predefined threshold, the beam failure triggers;
2. when the number of beam failures within a certain period of time reaches a second predefined threshold, the beam failure triggers;
3. when duration of the beam failure reaches a third predefined threshold, the beam failure triggers.

It can be seen that, on basis of the first embodiment, this embodiment of the present disclosure can flexibly allocate random access resources through the solutions for allocating random access resources between the network device and the UE. Further, in this embodiment of the present disclosure, by setting condition for determining beam failure trigger, whether beam failure occurs in the UE can be accurately determined, thereby avoiding a situation in which a beam failure recovery mechanism is performed when no beam failure occurs and then further preventing the waste of resources.

Third Example

Figure 5:
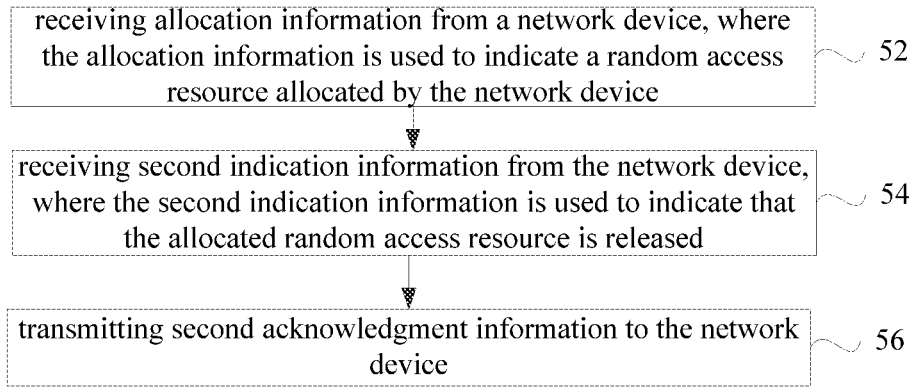
FIG. 5 is a schematic flowchart of a random access resource processing method according to a third embodiment of the present disclosure.

FIG. 5 is a schematic flowchart of a random access resource processing method according to a third embodiment of the present disclosure. Referring to FIG. 5, the method specifically includes the following steps.

Step 52: receiving, by a UE, allocation information from a network device, where the allocation information is used to indicate an allocated random access resource;

Step 54: receiving second indication information from the network device, where the second indication information is used to indicate that the allocated random access resource is released; where the manner of receiving the second indication information may include: receiving, through Medium Access Control (MAC) Control Element (CE), the second indication information carried in the MAC CE;

Step 56: transmitting second acknowledgment information to the network device, where the second acknowledgment information is used to indicate that the second indication information has been received.

The manner of transmitting second acknowledgment information may include:
feeding back Uplink Control Information (UCI) carrying the second acknowledgment information to the network device through physical uplink control channel (PUCCH); or, feeding back radio resource control (RRC) message carrying the second acknowledgment information to the network device through RRC; or, feeding back, through Medium Access Control (MAC) Control Element (CE), the second acknowledgment information carried in the MAC CE to the network device.

It should be noted that, the scheme for obtaining the allocated random access resource in the step 52 is similar to that in the second embodiment, and thus details will not elaborated herein and may be refer to the relevant description in the second embodiment.

It can be seen that in this embodiment of the present disclosure, after the network device allocates the random access resource for the UE side, the network device may release the allocated random access resource, and the released random access resource is unavailable to the UE. The network device may allocate the released random access resources for other UEs, thereby achieving the purpose of reasonably scheduling of the random access resources and improving usage efficiency of the random access resources.

Fourth Example

Figure 6:
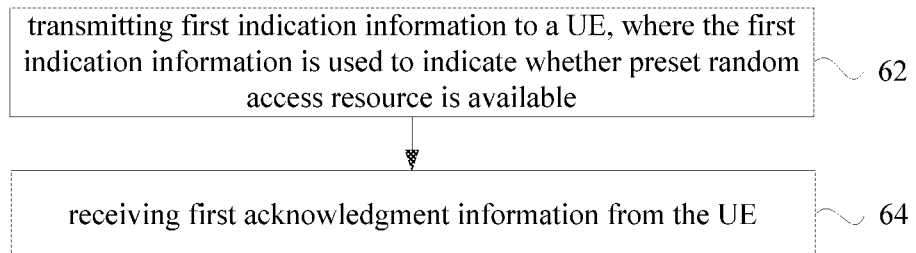
FIG. 6 is a schematic flowchart of a random access resource processing method according to a fourth embodiment of the present disclosure.

FIG. 6 is a schematic flowchart of a random access resource processing method according to a fourth embodiment of the present disclosure. Referring to FIG. 6, the method specifically includes the following steps.

Step 62: transmitting, by a network device, first indication information to a UE, where the first indication information is used to indicate whether preset random access resource is available.

The preset random access resource may be random access resource allocated by the network device for UE or predefined random access resource. An example in which the network device allocates the random access resource for the UE, is given below for illustration.

The step 62 may include:
transmitting activation indication information to the UE, where the activation indication information is used to indicate that the allocated random access resource is available, or transmitting deactivation indication information to the UE, where the deactivation indication information is used to indicate that the allocated or activated random access resource is not available.

The condition for transmitting the deactivation indication information may be: when determining that the allocated random access resource is in an available state, or, after completing the response to the beam failure recovery request and the allocated random access resource is in the available state, transmitting the deactivation indication information.

The condition for transmitting the activation indication information may be: after determining that the allocated random access resource is in an unavailable state, transmitting the activation indication information.

In addition, the manner of transmitting the first indication information to the user equipment may include the following:

transmitting Downlink Control Information (DCI) carrying the first indication information to the UE through physical downlink control channel (PDCCH); or, transmitting radio resource control (RRC) message carrying the first indication information to the UE through RRC; or, transmitting, through Medium Access Control (MAC) Control Element (CE), the first indication information carried in the MAC CE to the UE.

The allocated random access resource includes at least one of time-domain random access resource, frequency-domain random access resource, allocation of preamble codes, bandwidth part BWPs constituting the system bandwidth, beam resources, and Synchronization Signal Block (SS Block) associated with beam resources/Channel State Information Reference Signal (CSI-RS).

It is not difficult to understand that the network device may allocate the random access resource for the UE based on ID of candidate beams. For example, based on ID of the candidate beam, time-domain random access resource and frequency-domain random access resource associated with the ID are allocated; and then, based on the default rule, the random access resource may be formed by combining the default bandwidth part BWP constituting the system bandwidth and spatial domain random access resource with the time-domain random access resource and frequency-domain random access resource associated with the ID.

Step 64: receiving first acknowledgment information from the UE; where the first acknowledgment information is used to indicate that a receiver of the first indication information has received the first indication information.

It should be noted that this embodiment of the present disclosure corresponds to the first embodiment, and thus details will not elaborated herein and may be refer to the relevant description in the first embodiment.

It can be seen that in one embodiment of the present disclosure, by adding a feedback mechanism to the downlink indication information, the UE feeds back the acknowledgment information to the network device when the UE receives the indication information. This can avoid problems of waste of resources caused by the two sides' different "understanding" of whether the allocated random access resources are available, or inability to perform beam failure recovery normally due to "understanding" conflict.

Fifth Embodiment

Figure 7:
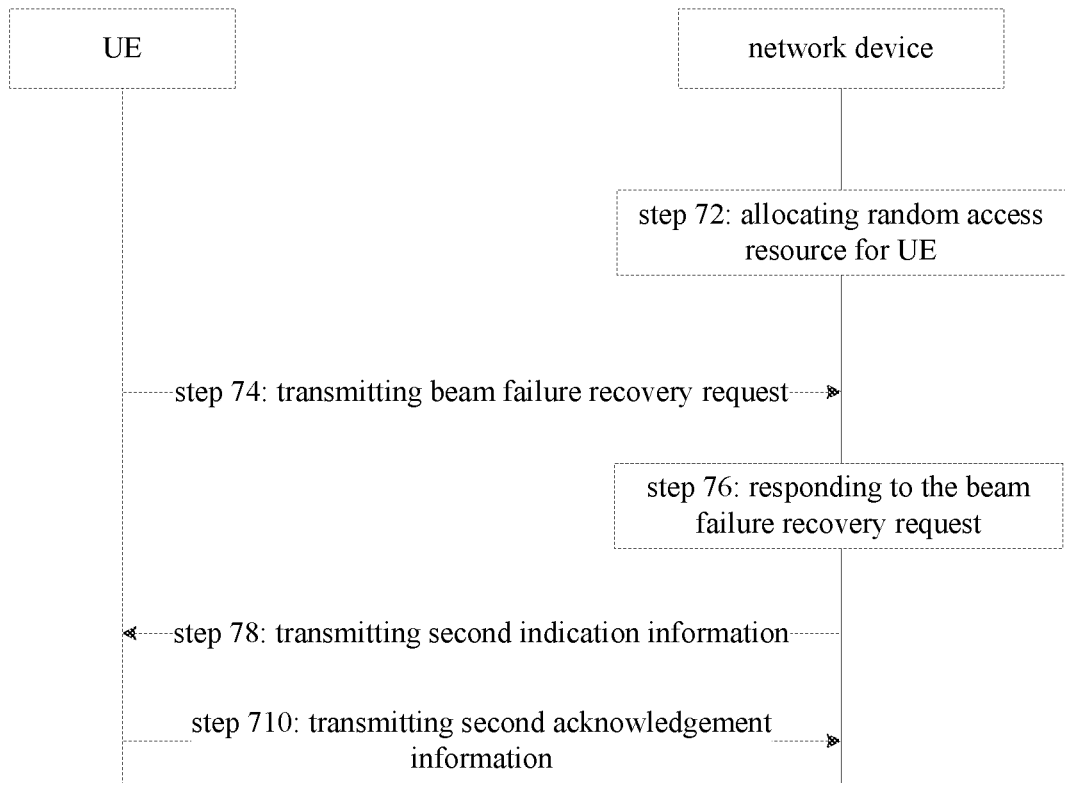
FIG. 7 is a schematic flowchart of a random access resource processing method according to a fifth embodiment of the present disclosure.

FIG. 7 is a schematic flowchart of a random access resource processing method according to a fifth embodiment of the present disclosure. Referring to FIG. 7, the method specifically includes the following steps.

Step 72: allocating, by a network device, available random access resource for a UE.

The step 72 may specifically include two implementation manners:

first implementation manner: after receiving an allocation request from the UE, the network device allocates the random access resource for the UE; where the allocation request is used to request for allocating random access resources;

second implementation manner: the network device actively allocates the random access resource for the UE.

In response to a first beam failure recovery request initiated by the UE, the network device allocates the allocation information for the UE. The allocated random access resource is used by the UE to initiate a second beam failure recovery request.

Step 74: when the UE triggers a beam failure condition, the UE transmits a beam failure recovery request to the network device through the allocated random access resource.

Step 76: responding, by the network device, to the beam failure recovery request.

It should be noted that, in conjunction with FIG. 1, in the step 76, a beam failure recovery mechanism may be performed to respond to the beam failure recovery request.

The beam failure recovery mechanism is used to switch a communication link from a failed beam to an available beam.

Step 78: transmitting second indication information to the UE, where the second indication information is used to indicate that the allocated random access resource is released.

It should be noted that the condition for allowing transmission of the second indication information is determined by the network device, and may be exemplified as follows:
determining that the beam is in an idle state, or after completing response to a beam failure recovery request, or, determining that the allocated random access resource is in an unavailable state.

The manner for transmitting the second indication information to the UE may be:
transmitting, through Medium Access Control (MAC) Control Element (CE), the second indication information carried in the MAC CE, to the UE.

Accordingly, the UE may receive the corresponding second indication information through the MAC CE.

Step 710: transmitting, by the UE, second acknowledgement information to the network device, where the second acknowledgement information is used to indicate that a receiver of the second acknowledgement information has received the second indication information.

It should be noted that the UE may transmit the second acknowledgement information to the network device through the MAC CE carrying the second acknowledgement information. Accordingly, the network device receives the corresponding second acknowledgment information through the MAC CE.

It can be seen that, in this embodiment of the present disclosure, the network device allocates available random access resources to the UE, so that when a beam failure occurs in the UE, the UE can directly initiate the beam failure recovery to the network device based on the available random access resource, thereby completing the beam failure recovery as soon as possible. Further, in this embodiment of the present disclosure, the network device may also decide whether to release the allocated random access resources based on actual conditions, and allocate the allocated random access resources for other UEs, thereby achieving the purpose of improving resource utilization rate.

Sixth Embodiment

Figure 8:
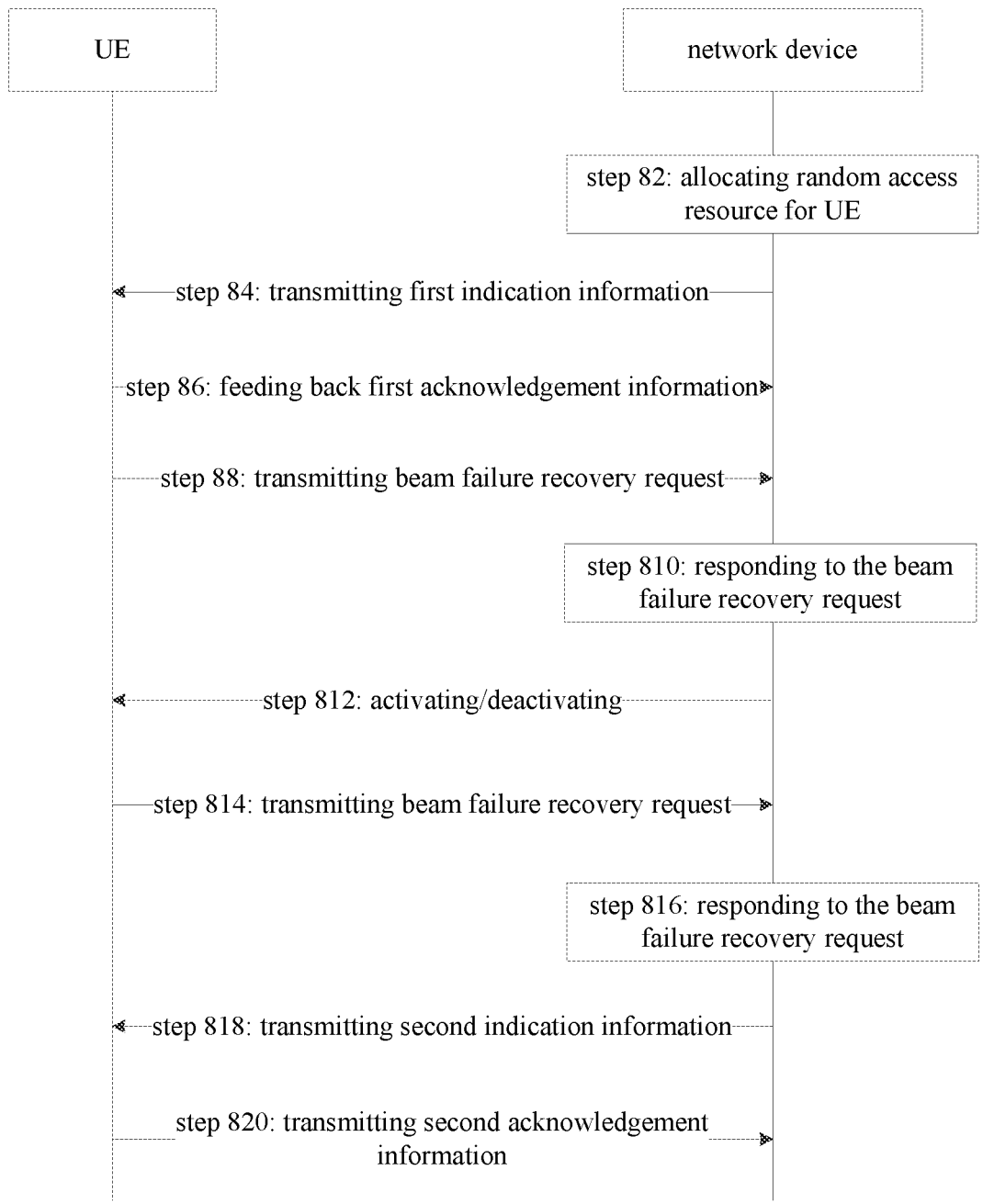
FIG. 8 is a schematic flowchart of a random access resource processing method according to a sixth embodiment of the present disclosure.

FIG. 8 is a schematic flowchart of a random access resource processing method according to a sixth embodiment of the present disclosure. Referring to FIG. 8, the method specifically includes the following steps.

Step 82: allocating, by a network device, available random access resource for a UE.

The random access resource allocated by the network device is an inactive random access resource.

The implementation of the step 82 is similar to the implementation of the step 72 in the seventh embodiment and thus will not be elaborated herein.

Step 84: transmitting, by the network device, first indication information to the UE, where the first indication information is used to indicate whether the allocated random access resource is available.

The first indication information includes: activation indication information or deactivation indication information. The activation indication information is used to activate the allocated random access resources, thereby enabling the allocated random access resources to be available. The deactivation indication information is used for deactivate the allocated random access resources or the activated random access resources, thereby enabling the allocated random access resources to be unavailable.

It is not difficult to understand that activation-deactivation may be a constantly changing process. The network device can freely decide to activate the allocated random access resources for the UE, and can also deactivate the available allocated random access resources and allocate them to other UEs.

Step 86: feeding back, by the UE, first acknowledgement information to the network device, to notify the network device that the UE has received the first indication information.

Step 88: when the first indication information is the activation indication information, initiating, by the UE, a beam failure recovery request to the network device based on the allocated random access resource when the beam failure condition is triggered.

Step 810: performing, by the network device, a beam failure recovery mechanism, in response to the beam failure recovery request issued by the UE.

Step 812: selectively deciding, by the network device, to release the allocated random access resources, or re-cycling deactivation-activation process again.

Step 814: when the beam failure condition is triggered again, re-initiating, by the UE, the beam failure recovery request.

Step 816: responding, by the network device, to the beam failure recovery request.

Step 818: when satisfying a predetermined condition, transmitting, by the network device, second indication information to the UE, where the second indication information is used to indicate that the allocated random access resource is released.

Step 820: transmitting, by the UE, second acknowledgement information to notify the network device that the second indication information has been received.

The network device may decide by itself to perform the step 818 at any feasible time point in the steps 84-816. For example, after the step 84 is completed, the network device may directly notify the UE that the allocated random access resource is released; or, after completing the beam failure recovery corresponding to the step 810 or the step 816, the network device releases the allocated random access resource.

It can be seen that this embodiment of the present disclosure is different from the fifth embodiment in that the network device allocates an inactive random access resource for the UE, and the inactive random access resource cannot be used to initiate a beam failure recovery request until the inactive random access resource is further activated by the network device. This further increases the flexibility of the network device in allocation of random access resources.

Seventh Embodiment

Figure 9:
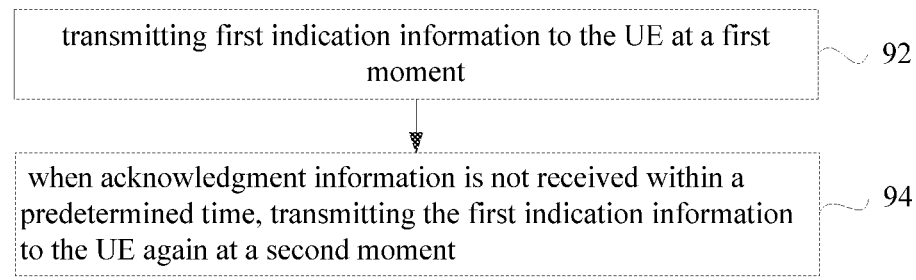
FIG. 9 is a schematic flowchart of a random access resource processing method according to a seventh embodiment of the present disclosure.

FIG. 9 is a schematic flowchart of a random access resource processing method according to a seventh embodiment of the present disclosure. Referring to FIG. 9, on the basis of the first embodiment, this method further includes the following steps.

Step 92: transmitting first indication information to the UE at a first moment, where the first indication information is used to indicate whether a preset random access resource is available.

Step 94: when acknowledgment information is not received within a predetermined time, transmitting the first indication information to the UE again at a second moment.

The acknowledgment information is used to indicate that the UE has received the indication information.

An implementation manner of the step 94 may include: transmitting the first indication information to the UE through a first beam; where the first beam is a beam other than a beam currently used to transmit the first indication information.

This embodiment of the present disclosure corresponds to the first embodiment, and thus similarities will not be elaborated herein.

In addition, this embodiment of the present disclosure adds a remedial measure on the basis of the first embodiment, so that the network device transmits the first indication information again when the first acknowledgment information is not received. This can avoid defects that the first indication information cannot be normally transmitted to the UE due to accidents or extreme conditions, or the first acknowledgment information cannot be normally transmitted to the network device, thereby achieving the purpose of avoiding waste of the allocated random access resources and inability to perform beam failure recovery normally.

For the above method embodiments, for the sake of brevity, they are all described as a series of action combinations, but those skilled in the art should understand that the embodiments of the present disclosure are not limited by the described order of actions, because some steps in the embodiments of the present disclosure may be performed in other orders or at the same time. In addition, those skilled in the art should also understand that the embodiments described in the specification are optional embodiments, and the actions involved are not necessarily required in the embodiments of the present disclosure.

Eighth Example

Figure 10:
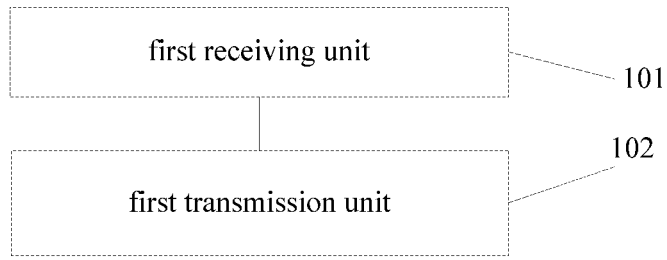
FIG. 10 is a schematic diagram of a random access resource processing device according to an eighth embodiment of the present disclosure.

FIG. 10 is a schematic diagram of a random access resource processing device according to an eighth embodiment of the present disclosure. Referring to FIG. 10, the device specifically includes a first receiving unit 101 and a first transmission unit 102.

The first receiving unit 101 is used to receive first indication information from a network device, where the first indication information is used to indicate whether preset random access resource is available.

The first transmission unit 102 is used to transmit first acknowledgment information to the network device; where the first acknowledgment information is used to indicate that the first indication information has been received.

The preset random access resource may be random access resource allocated by the network device for UE. The allocated random access resource includes at least one of time-domain random access resource, frequency-domain random access resource, allocation of preamble codes, bandwidth part BWPs constituting the system bandwidth, beam resources, and Synchronization Signal Block (SS Block) associated with beam resources/Channel State Information Reference Signal (CSI-RS).

A first implementation manner of the eighth embodiment of the present disclosure is:

the first receiving unit 101 is used to receive activation indication information from the network device, where the activation indication information is used to indicate that the allocated random access resource is available; or, receive deactivation indication information from the network device, where the deactivation indication information is used to indicate that the allocated or activated random access resource is unavailable.

After receiving the activation indication information, when triggering beam failure recovery, a fifth transmission unit (not shown) transmits the beam failure recovery request based on the allocated random access resources.

After the deactivation indication information is received, the allocated random access resource is unavailable until receiving the activation indication information.

The first transmission unit 102 is used to, feed back, Uplink Control Information (UCI) carrying the first acknowledgment information to the network device through physical uplink control channel (PUCCH); or, feed back radio resource control (RRC) message carrying the first acknowledgment information to the network device through RRC; or, feed back, through Medium Access Control (MAC) Control Element (CE), the first acknowledgment information carried in the MAC CE to the network device.

Accordingly, the network device may receive the first acknowledgment information fed back by the first transmission unit 102 by a corresponding receiving manner.

A second implementation manner of the eighth embodiment of the present disclosure is:

on the basis of the first implementation manner, the random access resource processing device further includes: a second receiving unit, a second transmission unit and a third receiving unit;

the second receiving unit is used to receive allocation information transmitted by the network device, where the allocation information is used to indicate the allocated random access resource;

the second transmission unit is used to transmit third acknowledgement information to the network device to notify the network device that the allocation information has been received.

Alternatively, the second transmission unit is used to transmit an allocation request to the network device, where the allocation request is used to request for allocating a random access resource, and transmit acknowledgement information to the network device after receiving feedback information from the network device;

the second receiving unit is used to receive allocation information transmitted by the network device, where the allocation information is used to indicate the random access resource allocated by the network device according to the allocation request; and the third transmission unit is used to, when the random access resource allocated by the network device is determined in an available state according to the allocation information, transmit a beam failure recovery request to the network device based on the allocated random access resource when the beam failure recovery is triggered.

Accordingly, the network device performs a beam failure recovery mechanism in response to the beam failure recovery request.

The third implementation manner of the eighth embodiment of the present disclosure is:

on the basis of the second implementation manner, the random access resource processing device further includes:

a fourth receiving unit used to receive second indication information transmitted by the network device, where the second indication information is used to indicate that the allocated random access resource is released;

a fourth transmission unit used to transmit second acknowledgment information to the network device, where the second acknowledgment information is used to indicate that the second indication information has been received.

The fourth receiving unit may receive the second indication information transmit by the network device through Medium Access Control (MAC) Control Element (CE).

The fourth transmission unit may feed back Uplink Control Information (UCI) carrying the second acknowledgment information to the network device through physical uplink control channel (PUCCH); or, feed back radio resource control (RRC) message carrying the second acknowledgment information to the network device through RRC; or, feed back the second acknowledgment information to the network device through Medium Access Control (MAC) Control Element (CE).

It can be seen that in one embodiment of the present disclosure, by adding a feedback mechanism to the downlink indication information, the UE feeds back the acknowledgment information to the network device when the UE receives the indication information transmitted by the network device, so that the network device and the UE can know whether the allocated random access resources are available. Then, the random access resources can be reasonably used and the beam failure recovery can be performed normally.

Ninth Example

Figure 11:
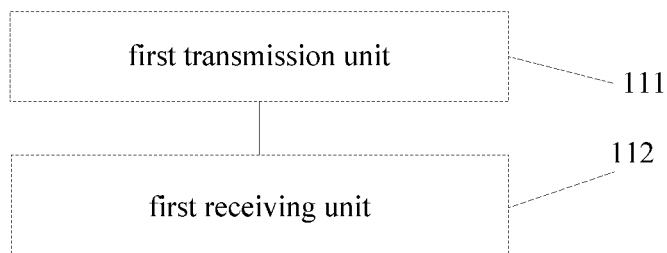
FIG. 11 is a schematic diagram of a random access resource processing device according to a ninth embodiment of the present disclosure.

FIG. 11 is a schematic diagram of a random access resource processing device according to a ninth embodiment of the present disclosure. Referring to FIG. 11, the device specifically includes a first transmission unit 111 and a first receiving unit 112.

The first transmission unit 111 is used to transmit first indication information to the UE, where the first indication information is used to indicate whether a preset random access resource is available.

The first receiving unit 112 is used to receive first acknowledgement information transmitted by the UE, where the first acknowledgement information is used to indicate that the UE has received the first indication information.

A first implementation manner of the ninth embodiment of the present disclosure is:

the first transmission unit 111 is used to transmit deactivation indication information to the UE, where the deactivation indication information is used to indicate that the allocated or activated random access resource is unavailable; or, transmit activation indication information to the UE, where the activation indication information is used to indicate that the allocated random access resource is available.

The condition for allowing transmission of the activation indication information to the UE may include:

determining that the allocated random access resource is in an unavailable state, allowing transmission of the activation indication information.

The first receiving unit 112 is used to, transmit Downlink Control Information (DCI) carrying the first indication information to the UE through physical downlink control channel (PDCCH); or, transmit radio resource control (RRC) message carrying the first indication information to the UE through RRC; or, transmit the first indication information to the UE through Medium Access Control (MAC) Control Element (CE).

Accordingly, the UE may receive the first indication information in a corresponding receiving manner. For example, the UE transmits the first acknowledgement information to the network device through Medium Access Control (MAC) Control Element (CE); and the network device receives the first indication information carried in the MAC CE through the MAC CE.

A second implementation manner of the ninth embodiment of the present disclosure is:
on basis of the previous implementation manner, the method further includes:
a second transmission unit used to transmit allocation information to the UE, where the allocation information is used to indicate the allocated random access resource. The allocated random access resource may be directly available or may be not be available until the allocated random access resource is active in subsequent step.

The condition for transmitting the allocation information to the UE may be:
in response to a first beam failure recovery request, transmitting the allocation information, where the allocated random access resource is used to initiate a second beam failure recovery request.

Accordingly, the device further includes: a response unit used to respond to the first beam failure recovery request. Specifically, the response unit is used to perform a beam failure recovery mechanism when receiving the first beam failure recovery request transmitted by the UE.

The beam failure recovery mechanism is used to switch a communication link from a failed beam to an available beam.

A third implementation manner of the ninth embodiment of the present disclosure is:
on basis of the first implementation manner, the method further includes:
a second receiving unit used to receive an allocation request transmitted by the UE, where the allocation request is used to request for allocating a random access resource;
a third transmission unit used to transmit allocation information to the UE, where the allocation information is used to indicate a random access resource that is allocated based on the allocation request.

In the foregoing three implementation manners, the allocated random access resources include at least one of time-domain random access resource, frequency-domain random access resource, allocation of preamble codes, bandwidth part BWPs constituting the system bandwidth, beam resources, and Synchronization Signal Block (SS Block) associated with beam resources/Channel State Information Reference Signal (CSI-RS).

A fourth implementation manner of the ninth embodiment of the present disclosure is:
on basis of any of the foregoing three implementation manners, the method further includes:
a fourth transmission unit used to transmit second indication information to the UE, where the second indication information is used to indicate that the allocated random access resource is released;
a third receiving unit used to receive second acknowledgement information transmitted by the UE, where the second acknowledgement information is used to indicate that the UE has received the second indication information.

The condition that the fourth transmission unit transmits the second indication information may be:
when determining that the beam is in an idle state, or after completing response to a beam failure recovery request, or, determining that the allocated random access resource is in an unavailable state.

The manner for transmitting the second indication information may be: transmitting the second indication information to the UE through Medium Access Control (MAC) Control Element (CE).

Accordingly, the UE may receive the second indication information carried in the MAC CE through the MAC CE.

It can be seen that in one embodiment of the present disclosure, by adding a feedback mechanism to the downlink indication information, the UE feeds back the acknowledgment information to the network device when the UE receives the indication information, so that the network device and the UE can know whether the allocated random access resources are available. Then, the random access resources can be reasonably used and the beam failure recovery can be performed normally.

Tenth Example

Figure 12:
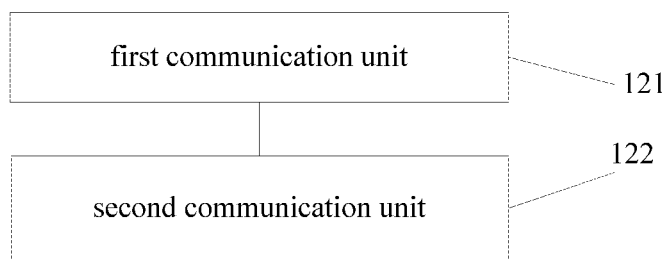
FIG. 12 is a schematic diagram of a random access resource processing device according to a fifth embodiment of the present disclosure.

FIG. 12 is a schematic diagram of a random access resource processing device according to a tenth embodiment of the present disclosure. Referring to FIG. 12, on the basis of the ninth embodiment, the first transmission unit 111 of the device is further defined. The first transmission unit 111 may include a first communication unit 121 and a second communication unit 122.

The first communication unit 121 is used to transmit first indication information to the UE at a first moment.

The second communication unit 122 is used to, when acknowledgment information is not received within a predetermined time, transmit the first indication information to the UE again at a second moment.

The acknowledgment information is used to indicate that the UE has received the indication information.

One manner in which the second communication unit 122 transmits the first indication information again, includes: transmitting the first indication information to the UE through a first beam; where the first beam is a beam other than a beam currently used to transmit the first indication information.

It can be seen that the embodiment of the present disclosure adds a remedial measure on the basis of the ninth embodiment, so that the network device transmits the indication information again when the acknowledgment information is not received. This can avoid defects that the first indication information cannot be normally transmitted to the UE due to accidents or extreme conditions, or the first acknowledgment information cannot be normally transmitted to the network device, thereby avoiding waste of the allocated random access resources and inability to perform beam failure recovery normally.

For the above device embodiment, since it is basically similar to the method embodiment, the description thereof is relatively simple and similarities may refer to the description of the method embodiment. It should be noted that various components of the device of the present disclosure are logically divided according to their functions to be implemented, but the present disclosure is not limited to this, and the various components may be re-divided or combined as required.

Eleventh Example

Figure 13:
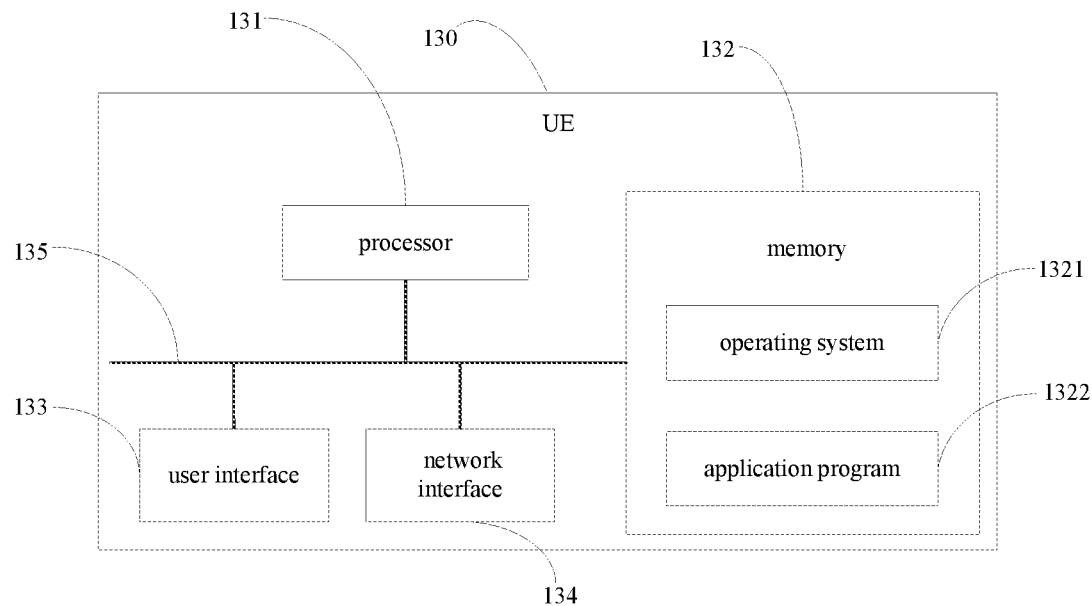
FIG. 13 is a schematic diagram of a user equipment according to an eleventh embodiment of the present disclosure.

FIG. 13 is a schematic diagram of a user equipment (UE) according to an eleventh embodiment of the present disclosure. The UE 130 shown in FIG. 13 includes at least one processor 131, a memory 132, at least one network interface 134, and a user interface 133. The various components in the UE 130 are coupled together by a bus system 135. It will be appreciated that the bus system 135 is used to implement connection communication between these components. The bus system 135 includes a power bus, a control bus, and a status signal bus in addition to the data bus. However, for clarity of description, various buses in FIG. 13 are labeled as bus system 135.

The user interface 133 may include a monitor, keyboard, or clickable device (for example, a mouse, track ball), touchpad, or touch screen.

It can be understood that the memory 1302 in embodiments of the present disclosure may be a volatile storage or a nonvolatile storage, or both the volatile storage and non-volatile storage. The nonvolatile storage may be Read Only Memory (ROM), Programmable Read-Only Memory (PROM), Erasable Programmable Read-Only Memory (EPROM), Electrically Erasable Programmable Read-Only Memory (EEPROM) or flash. The volatile storage may be a Random Access Memory (RAM), which is used as an external cache. As an illustrative but not restrictive specification, many forms of RAMs are available, such as Static RAM (SRAM), Dynamic RAM (DRAM), Synchronous DRAM (SDRAM), Double Data Rate SDRAM (DDRS-DRAM), Enhanced SDRAM (ESDRAM), Synchronization Link DRAM (SLDRAM) and Direct Rambus RAM (DR-RAM). The memory 1302 in the system and method described in embodiments of the present disclosure include, but is not limited to, these and any other suitable types of storages.

In some embodiments, the memory 1302 stores following elements, such as executable modules, data structure, subset thereof, or superset thereof: operating system 1321 and an application program 1322.

The operating system 1321 includes various kinds of system programs, such as a framework layer, a core library layer and a driver layer, which are used to implement various kinds of basic services and process hardware-based tasks. The application program 1322 includes various kinds of application programs, such as Media Player and Browser, which are used to implement various kinds of application services. Programs, which are used to implement the methods in embodiments of the present disclosure, may be included in the application program 1322.

In an embodiment of the present disclosure, the UE 130 further includes a computer program which is stored on the memory 1302 and executable on the processor 131. The computer program is executed by the processor 131 to implement the following steps:

receiving first indication information from a network device, where the first indication information is used to indicate whether preset random access resource is available;

transmitting first acknowledgment information to the network device.

The methods in the above embodiments of the present disclosure may be applied to or implemented by the processor 131. The processor 131 may be an integrated circuit chip with signal processing capability. In the implementation process, each step of the above method can be completed by the integrated logic circuit of the hardware in processor 131 or the instructions in the form of software. The processor 131 mentioned above may be a general purpose processor, Digital Signal Processor (DSP), Application Specific Integrated Circuit (ASIC), Field Programmable Gate Array (FPGA) or other Programmable logic device, discrete Gate or transistor logic device, discrete hardware component. Methods, steps and logical block diagrams disclosed in embodiments of the present disclosure may be realized or implemented. A general-purpose processor can be a microprocessor or the general-purpose processor can be any regular processor, etc. The steps in combination with the method disclosed in embodiments of the present disclosure may be directly embodied as the execution of the hardware decoding processor or by a combination of hardware and software modules in the decoding processor. Software modules can be located in random access memory, flash memory, read only memory, programmable read only memory or electrically-erasable programmable memory, register and other mature computer readable storage media in this field. The storage medium is located in the memory 132, and the processor 131 reads the information in the memory 132 to implement steps in the above method in combination with the hardware. Specifically, the computer readable storage media stores a computer program which is executed by the processor 131 to implement steps of the random access resource processing method in the above embodiments.

It can be understood that these embodiments described in the present disclosure may be implemented with hardware, software, firmware, middleware, microcode, or a combination thereof. As for hardware implementation, the processing unit can be implemented in one or multiple Application-Specific Integrated Circuits (ASIC), Digital Signal Processors (DSP), Digital Signal Processing Devices (DSPD), Programmable Logic Devices (PLD), Field-Programmable Gate Arrays (FPGA), general-purpose processors, controllers, micro-controllers, micro-processors, and other electronic units or combinations thereof used to perform the functions described in the present disclosure.

For software implementations, the technologies described in the present disclosure can be implemented through the modules that perform the functions described in the present disclosure (such as procedures, functions, and so on). Software codes can be stored in the storage and executed by the processor. The storage can be implemented in or outside of the processor.

Optionally, the computer program is executed by the processor 131 to implement the following steps before receiving first indication information from a network device in case that the first indication information is used to indicate whether the random access resource that is allocated by the network device is available:

receiving allocation information from the network device, where the allocation information is used to indicate a random access resource that is allocated by the network device; or, transmitting an allocation request to the network device, where the allocation request is used to request for the network device to allocate random access resources.

The allocated random access resource includes at least one of time-domain random access resource, frequency-domain random access resource, allocation of preamble codes, bandwidth part BWPs constituting the system bandwidth, beam resources, and Synchronization Signal Block (SS Block) associated with beam resources/Channel State Information Reference Signal (CSI-RS).

After receiving the allocation information, if determining that the allocated random access resource is available, when triggering the beam failure recovery, a beam failure recovery request is transmitted to the network device based on the allocated random access resource.

After receiving the first indication information from the network device, when receiving from the network device second indication information indicating that the allocated random access resource is released, second acknowledgement information is transmitted to the network device.

The step of receiving second indication information includes: receiving the second indication information transmit from the network device through Medium Access Control (MAC) Control Element (CE).

The step of transmitting the second acknowledgement information includes:
feeding back Uplink Control Information (UCI) carrying the second acknowledgment information to the network device through physical uplink control channel (PUCCH); or, feeding back radio resource control (RRC) message carrying the second acknowledgment information to the network device through RRC; or, feeding back the second acknowledgment information to the network device through Medium Access Control (MAC) Control Element (CE).

The receiving the first indication information from the network device includes: receiving activation indication information from the network device, where the activation indication information is used to indicate that the allocated random access resource is available.

If the activation indication information is received, when triggering the beam failure recovery, a beam failure recovery request is transmitted based on the allocated random access resource.

The receiving the first indication information includes: receiving deactivation indication information, where the deactivation indication information is used to indicate that the allocated or activated random access resource is unavailable.

The receiving the first indication information includes: receiving the first indication information carried in the Medium Access Control (MAC) Control Element (CE).

The transmitting the first acknowledgement information includes: feeding back Uplink Control Information (UCI) carrying the first acknowledgment information to the network device through physical uplink control channel (PUCCH); or, feeding back radio resource control (RRC) message carrying the first acknowledgment information to the network device through RRC; or, feeding back the first acknowledgment information to the network device through Medium Access Control (MAC) Control Element (CE).

The UE 130 can implement various processes implemented by the UE in the foregoing embodiment. To avoid repetition, details are not described herein again.

It can be seen that in one embodiment of the present disclosure, by adding a feedback mechanism, the UE feeds back the acknowledgment information to the network device when the UE receives the indication information transmitted by the network device, so that the network device and the UE can know whether the allocated random access resources are available. Then, the random access resources can be reasonably used and the beam failure recovery can be performed normally.

Twelfth Example

Based on the same invention, one embodiment of the present disclosure provides a computer-readable storage medium. The computer-readable storage medium stores a random access resource processing program. The random access resource processing program is executed by a processor to implement steps of the random access resource processing method of any one of the first embodiment to the third embodiment.

Thirteenth Example

Figure 14:
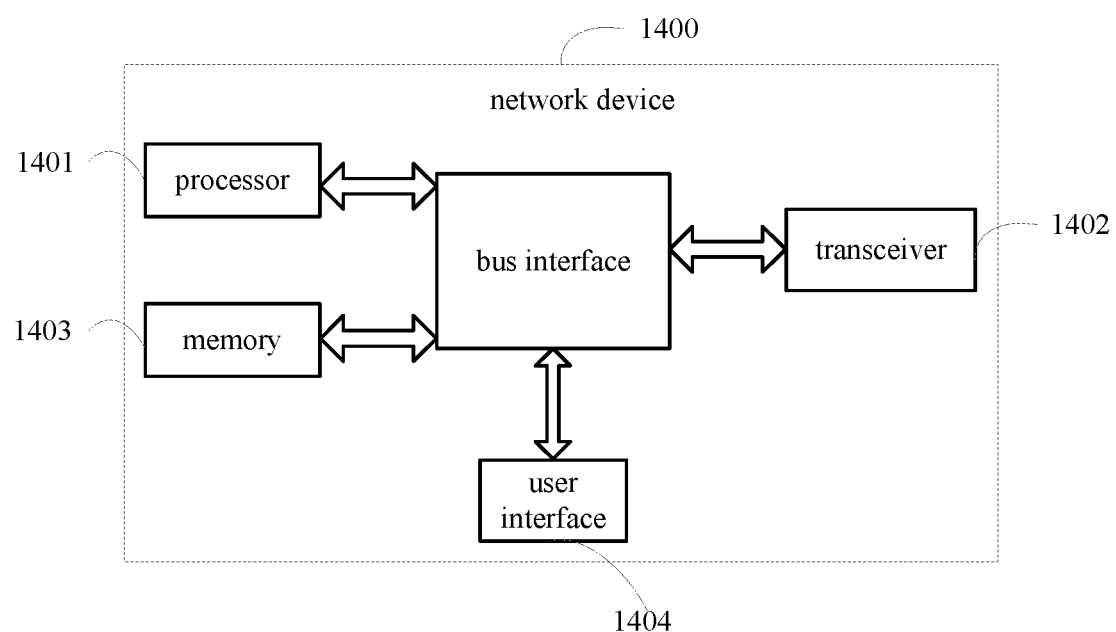
FIG. 14 is a schematic diagram of a network device according to a thirteenth embodiment of the present disclosure.

Referring to FIG. 14, FIG. 14 is a schematic diagram of a network device according to an embodiment of the present disclosure, which can implement details of the random access resource processing method of any one of the fourth embodiment to the seventh embodiment and achieve the same effect. As shown in FIG. 14, the network device 1400 may include a processor 1401, a transceiver 1402, a memory 1403, a user interface 1404 and a bus interface 1406.

In one embodiment of the present disclosure, the network device 1400 further includes: a computer program stored on the memory 1403 and executable on the processor 1401. When the computer program is executed by the processor 1401, the following steps are implemented:
transmitting first indication information to the UE, where the first indication information is used to indicate whether a preset random access resource is available;
receiving first acknowledgment information from the user equipment.

In FIG. 14, a bus architecture may include any number of interconnected buses and bridges. Specifically, various circuits of one or more processors, which are represented by the processor 1401, and the storage, which is represented by the memory 1403, are linked together. The bus architecture may link various other circuits, such as a peripheral device, voltage regulator and a power management circuit together. These features are well known in this field, therefore, this disclosure does not make further description on these features. The bus interface provides an interface. The transceiver 1402 may be multiple elements, including a transmitter and a receiver and provide units, which communicate with other devices on the transmission medium. For different UEs, the user interface 1404 may also be an interface capable of externally/internally connecting required devices which may include a keyboard, a monitor, a speaker, microphone, joystick.

The processor 1401 is responsible for managing the bus architecture and common processing and the memory 1403 may store data used by the processor 1401 when executing the operations.

Optionally, the computer program is executed by the processor 1401 to implement the following steps:
before transmitting first indication information which is used to indicate whether the allocated random access resource is available, allocating random access resource for the UE; transmitting allocation information to the UE, where the allocation information is used to indicate the allocated random access resources. The transmitting the allocation information includes: responding to a first beam failure recovery request, transmitting the allocation information to the UE, where the allocated random access resource is used for the UE to initiate a second beam failure recovery request. The responding to the first beam failure recovery request includes: receiving the first beam failure recovery request; performing a beam failure recovery mechanism; where the beam failure recovery mechanism is used to switch the communication link from the failed beam to the available beam; or, before transmitting the first indication information, receiving an allocation request from the UE, where the allocation request is used to request for allocating a random access resource; and transmitting allocation information to the user equipment, where the allocation information is used to indicate the random access resource allocated based on the allocation request.

The allocated random access resource includes at least one of time-domain random access resource, frequency-domain random access resource, allocation of preamble codes, bandwidth part BWPs constituting the system bandwidth, beam resources, and Synchronization Signal Block (SS Block) associated with beam resources/Channel State Information Reference Signal (CSI-RS).

After transmitting the allocation information, second indication information is transmitted to the UE. The second indication information is used to indicate that the preset random access resource is released. The second acknowledgment information from the UE is received. The transmitting the second indication information includes: when determining that the beam is in an idle state, transmitting the second indication information to the UE; or, after completing response to a beam failure recovery request, transmitting the second indication information to the UE; or, when determining that the allocated random access resource is in an unavailable state, transmitting the second indication information to the UE. The second indication information may be transmitted to the UE through Medium Access Control (MAC) Control Element (CE). The receiving the second acknowledgment information includes: receiving the second acknowledgment information from the UE through the MAC CE.

The transmitting the first indication information includes: transmitting the deactivation indication information to the UE, where the deactivation indication information is used to indicate that the allocated or activated random access resource is unavailable.

The transmitting the deactivation indication information includes:

when determining that the allocated random access resource is in an available state, allowing transmission of the deactivation indication information; or, after responding to the beam failure recovery request is completed and the allocated random access resource is in an available state, allowing transmission of the deactivation indication information.

The transmitting the first indication information includes: transmitting the activation indication information, where the activation indication information is used to indicate that the allocated random access resource is available. The transmitting the activation indication information includes: allowing transmission of the activation indication information when determining that the allocated random access resource is in an unavailable state.

The transmitting the first indication information includes: transmitting downlink control signal (DCI) information carrying the first indication information through physical downlink control channel (PDCCH); or, transmitting the RRC message carrying the first indication information through RRC; or, transmitting the first indication information through Medium Access Control (MAC) Control Element (CE).

The receiving the first acknowledgment information includes: receiving, through MAC CE, the first indication information carried in the MAC CE.

The transmitting the indication information again includes: transmitting the indication information by a first beam, where the first beam is a beam other than a beam currently used to transmit the first indication information.

In one embodiment of the present disclosure, the network device transmits a paging message to the UE, and then transmits downlink data packet to the UE when there is a data transmission indication for indicating transmission in the paging message. In this way, when the paging message is transmitted, the downlink data packet can be directly transmitted, thereby reducing delay in transmitting downlink data packets, as compared with that downlink data packets can be transmitted only after an RRC connection is established when receiving the paging message in the related art.

Fourteenth Example

Based on the same invention, one embodiment of the present disclosure provides a computer-readable storage medium. The computer-readable storage medium stores a random access resource processing program. The random access resource processing program is executed by a processor to implement steps of the random access resource processing method of any one of the fourth embodiment to the seventh embodiment.

Those skilled in the art will appreciate that embodiments of the disclosed embodiments may be provided as a method, a system, or a computer program product. Thus, embodiments of the present disclosure may take the form of an entirely hardware embodiment, an entirely software embodiment, or a combination of software and hardware. Moreover, embodiments of the present disclosure may take the form of a computer program product embodied on one or more computer usable storage media (including but not limited to disk storage, CD-ROM, optical storage, etc.) including computer usable program codes.

Embodiments of the present disclosure are described with reference to flowcharts and/or block diagrams of methods, terminal devices (systems), and computer program products according to the embodiments of the present disclosure. It should be understood that each flow and/or block of the flowcharts and/or block diagrams and a combination of a flow and/or a block of the flowcharts and/or block diagrams may be implemented by computer program instructions. These computer program instructions can be provided to a processor of a general purpose computer, a special purpose computer, an embedded processor or another programmable data processing terminal device to produce a machine such that the instructions executed by the processor of the computer or the other programmable data processing terminal device produce an apparatus for implementing functions specified by one or more processes in the flowcharts and/or by one or more blocks in the block diagrams.

The computer program instructions may also be stored in a computer readable storage that can direct the computer or the other programmable data processing terminal device to operate in a particular manner, such that the instructions stored in the computer readable storage produce an article of manufacture comprising an instruction apparatus. The instruction apparatus implements functions specified by one or more processes in the flowcharts and/or by one or more blocks in the block diagrams.

These computer program instructions may also be loaded onto the computer or the other programmable data processing terminal device such that a series of operational steps are performed on the computer or the other programmable terminal device to produce computer-implemented processing, such that the instructions executed by the computer or the other programmable terminal device provide steps for implementing functions specified by one or more processes in the flowcharts and/or by one or more blocks in the block diagrams.

In a typical distribution, a computing device includes one or more processors (CPUs), input/output interfaces, network interfaces, and a memory.

The memory may include non-persistent memory, random access memory (RAM), and/or non-volatile memory in a computer readable medium, such as read only memory (ROM) or flash memory. Memory is an example of a computer readable medium.

The computer readable media may be permanent and non-persistent, removable and non-removable media, which can store information by any method or technology. The information may be computer-readable instructions, data structures, modules of a program, or other data. Examples of the computer storage media include, but are not limited to, phase change memory (PRAM), static random access memory (SRAM), dynamic random access memory (DRAM), other types of random access memory (RAM), and read-only memory (ROM), electrically erasable programmable read-only memory (EEPROM), flash memory or other memory technology, read-only disc read-only memory (CD-ROM), digital versatile disc (DVD) or other optical storage, magnetic tape cartridges, magnetic tape magnetic disk storage or other magnetic storage devices or any other non-transmission media which may be used to store information that can be accessed by computing devices. As defined herein, the computer-readable media does not include computer-readable transitory media such as modulated data signals and carrier waves.

It should also be noted that in the present disclosure, the terms "comprise", "include" or any other variations are intended to encompass a non-exclusive inclusion, such that a process, method, commodity, or device that include a series of elements include not only those elements but also other elements that are not explicitly listed, or elements that are inherent to such process, method, commodity, or device. Without more restrictions, an element defined by the phrase "include a . . . " does not exclude the presence of an additional equivalent element in the process, method, commodity, or device including the element.

Those skilled in the art will appreciate that embodiments of the disclosed embodiments may be provided as a method, an system, or a computer program product. Thus, embodiments of the present disclosure may take the form of an entirely hardware embodiment, an entirely software embodiment, or a combination of software and hardware. Moreover, embodiments of the present disclosure may take the form of a computer program product embodied on one or more computer usable storage media (including but not limited to disk storage, CD-ROM, optical storage, etc.) including computer usable program codes.

The above are optional embodiments of the present disclosure and are not intended to limit the disclosure. It should be noted that those skilled in the art may make several improvements and modifications without departing from the principles of the present disclosure and these improvements and modifications are covered by the protection scope of the present disclosure.

What is claimed is:

1. A random access resource processing method, comprising:
   receiving first indication information from a network device, wherein the first indication information is used to indicate whether a preset random access resource is available for initiating a beam failure recovery request to the network device; and
   transmitting first acknowledgment information to the network device.

2. The method according to claim 1, wherein the first indication information is used to indicate whether a random access resource allocated by the network device is available;
   before the receiving first indication information from a network device, the method further comprises:
   receiving allocation information from the network device, wherein the allocation information is used to indicate the random access resource allocated by the network device.

3. The method according to claim 2, wherein before the receiving first indication information from a network device, the method further comprises: transmitting an allocation request to the network device, wherein the allocation request is used to request for the network device to allocate random access resource; and, receiving the allocation information from the network device, wherein the allocation information is used to indicate the random access resource allocated by the network device according to the allocation request;
   or,
   wherein the allocated random access resource comprises at least one of time-domain random access resource, frequency-domain random access resource, allocation of preamble codes, bandwidth part BWPs constituting system bandwidth, beam resources, and synchronization signal block (SS Block) associated with beam resources/channel state information reference signal (CSI-RS);
   or,
   wherein after the receiving allocation information from the network device, the method further comprises: when determining that the allocated random access resource is in an available state, transmitting a beam failure recovery request to the network device based on the allocated random access resource when a beam failure recovery is triggered.

4. The method according to claim 2, wherein the receiving first indication information from a network device, comprises:
   receiving activation indication information from the network device, wherein the activation indication information is used to indicate that the allocated random access resource is available;
   or,
   wherein the receiving first indication information from a network device, comprises:
   receiving deactivation indication information from the network device, wherein the deactivation indication information is used to indicate that the allocated or activated random access resource is unavailable.

5. The method according to claim 4, wherein after receiving activation indication information from the network device, the method further comprises:
   when triggering a beam failure recovery, transmitting a beam failure recovery request to the network device according to the allocated random access resources.

6. The method according to claim 1, wherein after the receiving first indication information from a network device, the method further comprises:

receiving second indication information from the network device, wherein the second indication information is used to indicate that the allocated random access resource is released;
transmitting second acknowledgment information to the network device.

7. The method according to claim 6, wherein the step of receiving second indication information from the network device, comprises: receiving the second indication information from the network device through medium access control (MAC) control element (CE);
or,
wherein the step of transmitting second acknowledgment information to the network device, comprises: feeding back uplink control information (UCI) carrying the second acknowledgment information to the network device through physical uplink control channel (PUCCH); or, feeding back radio resource control (RRC) message carrying the second acknowledgment information to the network device through RRC; or, feeding back, through the MAC CE, the second acknowledgment information carried in the MAC CE to the network device.

8. The method according to claim 1, wherein the receiving first indication information from a network device, comprises: receiving the first indication information from the network device through medium access control (MAC) control element (CE);
or,
wherein the transmitting first acknowledgment information to the network device, comprises: feeding back uplink control information (UCI) carrying the first acknowledgment information to the network device through physical uplink control channel (PUCCH); or, feeding back radio resource control (RRC) message carrying the first acknowledgment information to the network device through RRC; or, feeding back, through Medium Access Control (MAC) Control Element (CE), the first acknowledgment information carried in the MAC CE to the network device.

9. A random access resource processing method, comprising:
transmitting first indication information to a user equipment (UE), wherein the first indication information is used to indicate whether a preset random access resource is available for initiating a beam failure recovery request to the network device;
receiving first acknowledgment information from the UE.

10. The method according to claim 9, wherein the first indication information is used to indicate whether an allocated random access resource is available;
before transmitting first indication information to a user equipment (UE), the method further comprises:
allocating the allocated random access resource for the UE;
transmitting allocation information to the UE; wherein the allocation information is used to indicate the allocated random access resource.

11. The method according to claim 10, wherein the transmitting allocation information to the UE, comprises:
when responding to a first beam failure recovery request, transmitting the allocation information to the UE; wherein the allocated random access resource is used for the UE to initiate a second beam failure recovery request.

12. The method according to claim 11, wherein the responding to a first beam failure recovery request, comprises:
receiving the first beam failure recovery request from the UE;
performing a beam failure recovery mechanism;
wherein the beam failure recovery mechanism is used to switch communication link from a failed beam to an available beam.

13. The method according to claim 10, wherein before transmitting first indication information to a user equipment (UE), the method further comprises: receiving an allocation request from the UE, wherein the allocation request is used to request for allocating a random access resource; and transmitting the allocation information to the UE, wherein the allocation information is used to indicate the random access resource allocated based on the allocation request;
or,
wherein the allocated random access resource comprises at least one of time-domain random access resource, frequency-domain random access resource, allocation of preamble codes, bandwidth part BWPs constituting system bandwidth, beam resources, and synchronization signal block (SS Block) associated with beam resources/channel state information reference signal (CSI-RS).

14. The method according to claim 10, wherein after transmitting allocation information to the UE, the method further comprises:
transmitting second indication information to the UE; wherein the second indication information is used to indicate that the preset random access resource is released;
receiving second acknowledgment information from the UE.

15. The method according to claim 14, wherein the transmitting second indication information to the UE, comprises: when determining that the beam is in an idle state, transmitting the second indication information to the UE; or, after completing responding to a beam failure recovery request, transmitting the second indication information to the UE; or, when determining that the allocated random access resource is in an unavailable state, transmitting the second indication information to the UE;
or,
wherein the transmitting second indication information to the UE, comprises: transmitting the second indication information to the UE through Medium Access Control (MAC) Control Element (CE) carrying the second indication information; or,
wherein the receiving second acknowledgment information from the UE, comprises: receiving the second acknowledgment information from the UE through Medium Access Control (MAC) Control Element (CE).

16. The method according to claim 9, wherein the transmitting first indication information to a user equipment (UE), comprises: transmitting activation indication information to the UE; wherein the activation indication information is used to indicate that the allocated random access resource is available;
or,
wherein the transmitting first indication information to a user equipment (UE), comprises: transmitting deactivation indication information to the UE; wherein the deactivation indication information is used to indicate that the allocated or activated random access resource is unavailable.

17. The method according to claim 16, wherein the transmitting activation indication information to the UE, comprises: when determining that the allocated random access resource is in an unavailable state, transmitting the activation indication information to the UE;

or, wherein the transmitting deactivation indication information to the UE, comprises: when determining that the allocated random access resource is in an available state, transmitting the deactivation indication information to the UE; or, after responding to a beam failure recovery request is completed and the allocated random access resource is in an available state, transmitting the deactivation indication information to the UE.

18. The method according to claim 9, wherein the transmitting first indication information to a user equipment (UE), comprises: transmitting downlink control signal (DCI) information carrying the first indication information to the UE through physical downlink control channel (PDCCH); or, transmitting an RRC message carrying the first indication information to the UE through RRC; or, transmitting the first indication information to the UE through Medium Access Control (MAC) Control Element (CE) carrying the first indication information;

or, wherein the transmitting first indication information to a user equipment (UE), comprises: transmitting the first indication information to the UE at a first moment; and, when acknowledgment information is not received within a predetermined time, transmitting the first indication information to the UE again at a second moment;

or, wherein the receiving first acknowledgment information from the UE, comprises: receiving the first acknowledgment information from the UE through Medium Access Control (MAC) Control Element (CE).

19. A user equipment comprising: a memory, a processor, and a random access resource processing program stored on the memory and executable on the processor; wherein the random access resource processing program is executed by the processor to implement steps of:

receiving first indication information from a network device, wherein the first indication information is used to indicate whether a preset random access resource is available for initiating a beam failure recovery request to the network device; and transmitting first acknowledgment information to the network device.

* * * * *